United States Patent
Chaupin et al.

(10) Patent No.: US 12,498,185 B2
(45) Date of Patent: Dec. 16, 2025

(54) CONNECTOR

(71) Applicant: A. RAYMOND ET CIE, Grenoble (FR)

(72) Inventors: Jérôme Chaupin, St Pierre Allevard (FR); Frédéric Poggi, Fontaine (FR)

(73) Assignee: A. RAYMOND ET CIE, Grenoble (FR)

( * ) Notice: Subject to any disclaimer, the term of this patent is extended or adjusted under 35 U.S.C. 154(b) by 398 days.

(21) Appl. No.: 18/350,178

(22) Filed: Jul. 11, 2023

(65) Prior Publication Data
US 2024/0019220 A1 Jan. 18, 2024

(30) Foreign Application Priority Data
Jul. 12, 2022 (FR) .................................. 2207144

(51) Int. Cl.
*F28F 9/14* (2006.01)

(52) U.S. Cl.
CPC ............ *F28F 9/14* (2013.01); *F28F 2230/00* (2013.01)

(58) Field of Classification Search
CPC .......... F28F 9/14; F28F 2230/00; F28F 1/022; F28F 9/0221; F28F 9/165; F28F 9/264; F16L 37/0925; F16L 39/00; F28D 1/0478
USPC ........................................................ 165/173
See application file for complete search history.

(56) References Cited

U.S. PATENT DOCUMENTS

| | | | | |
|---|---|---|---|---|
| 5,170,841 A | * | 12/1992 | Briet | F28F 9/0258 165/76 |
| 11,940,230 B2 | * | 3/2024 | Thomsen | F28F 9/14 |
| 12,078,430 B2 | * | 9/2024 | Menner | F16L 39/00 |
| 2003/0131981 A1 | * | 7/2003 | Kohler | F28F 1/022 165/178 |
| 2017/0196127 A1 | * | 7/2017 | Seidl | F28F 21/067 |
| 2017/0343144 A1 | | 11/2017 | Hunt et al. | |
| 2019/0049049 A1 | * | 2/2019 | Ignaczak | H04W 4/80 |
| 2019/0348652 A1 | * | 11/2019 | Zhao | H01M 50/289 |
| 2022/0065555 A1 | | 3/2022 | Thomsen et al. | |
| 2023/0137448 A1 | | 5/2023 | Menner et al. | |

(Continued)

FOREIGN PATENT DOCUMENTS

| CN | 112771265 A | * 5/2021 | ............... F28F 1/26 |
|---|---|---|---|
| CN | 113544459 | 10/2021 | |
| CN | 116780020 A | * 9/2023 | .......... H01M 10/613 |

(Continued)

OTHER PUBLICATIONS

French Search Report to application No. FR2207144 dated Feb. 2, 2023.

*Primary Examiner* — Jon T. Schermerhorn, Jr.
(74) *Attorney, Agent, or Firm* — Perman & Green, LLP

(57) ABSTRACT

A connector for connecting to a tube is provided. The connector includes a head, a slide provided with a passage orifice, and a seal ring disposed between the head and the slide. The head includes a housing capable of receiving a first end of the slide. The slide received in the housing includes: a first position, called assembly position, in which the slide is capable of receiving a tube via a second end of the slide such that the tube passes through the seal ring; and a second position, called working position, in which the seal ring is likely to be compressed by the first end of the slide. The slide is displaced from the first position to the second position under the effect of a thrust force.

17 Claims, 5 Drawing Sheets

(56) References Cited

U.S. PATENT DOCUMENTS

2025/0286336 A1\*  9/2025  Hara .................... H01R 13/506

FOREIGN PATENT DOCUMENTS

| DE | 102023128944 A1 \* | 12/2024 | .......... H01M 10/647 |
| DE | 102023132932 A1 \* | 2/2025 | ............ H01M 50/30 |
| EP | 3506385 A1 \* | 7/2019 | .......... H01M 10/613 |
| EP | 3885689 | 9/2021 | |
| EP | 3923403 B1 \* | 6/2025 | ........... H01R 12/718 |
| GB | 1219703 A \* | 1/1971 | ........... E21B 43/013 |
| WO | 20200187612 | 9/2020 | |

\* cited by examiner

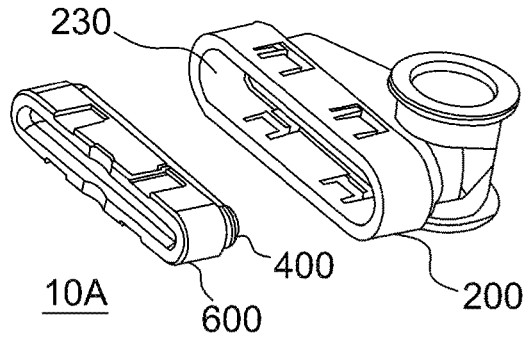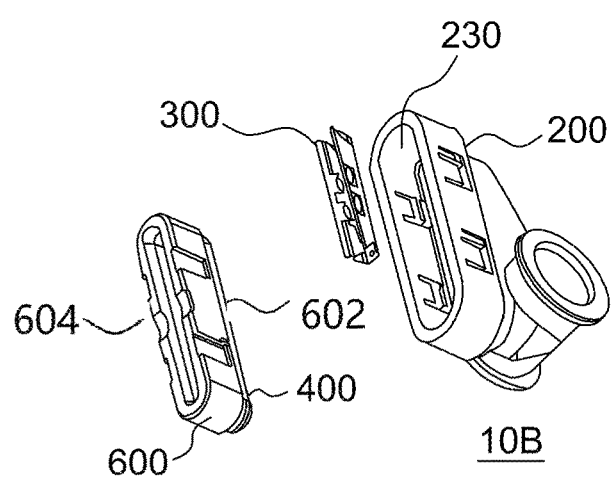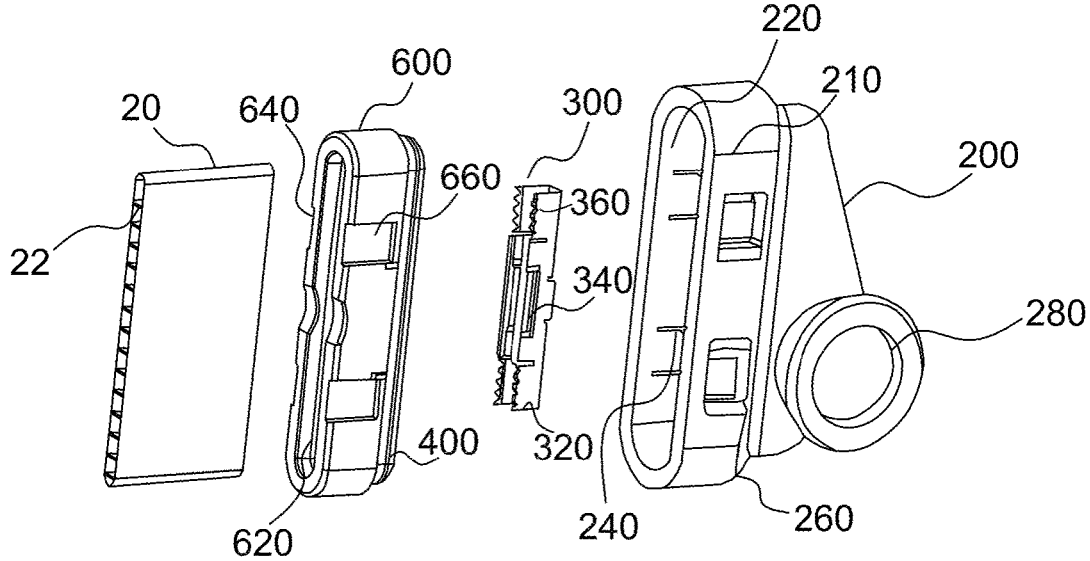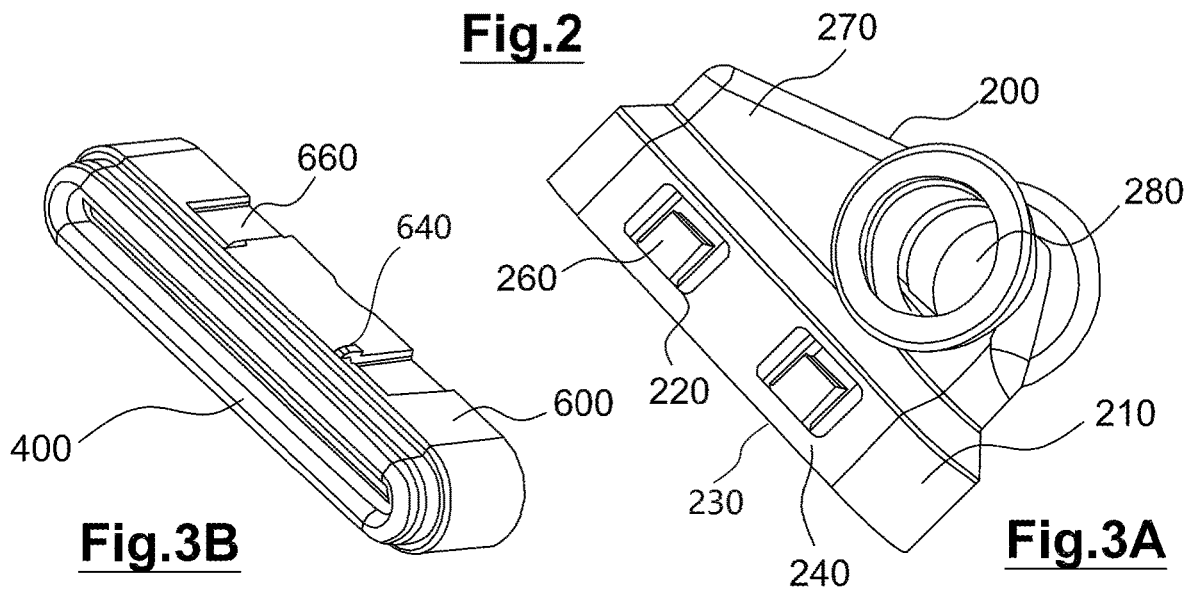

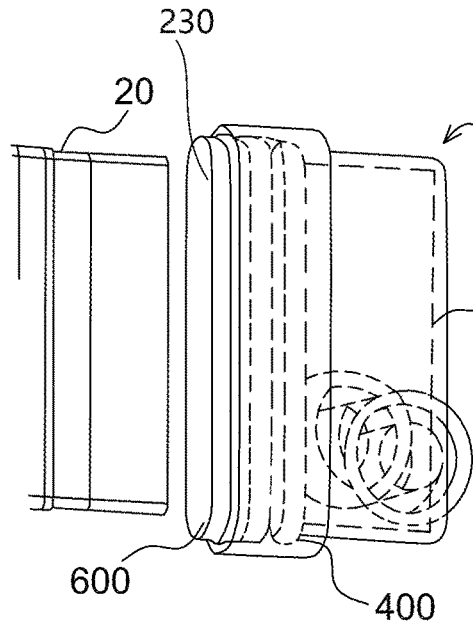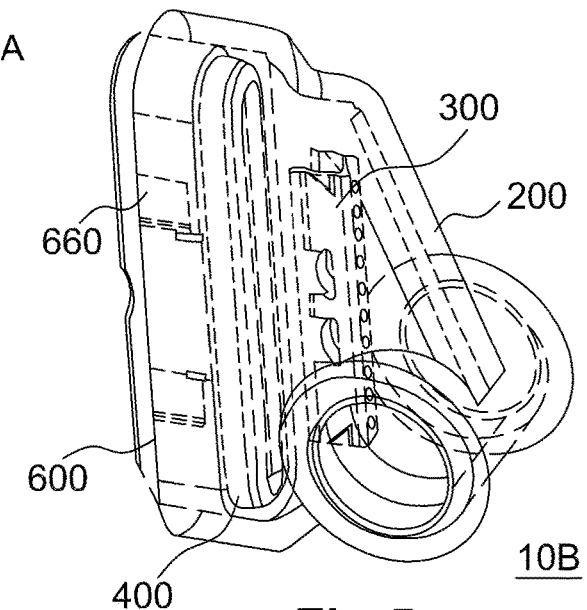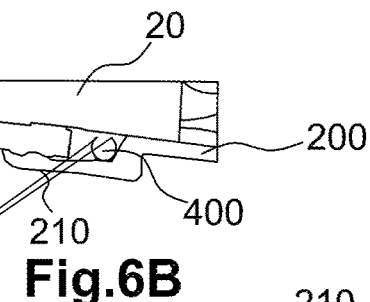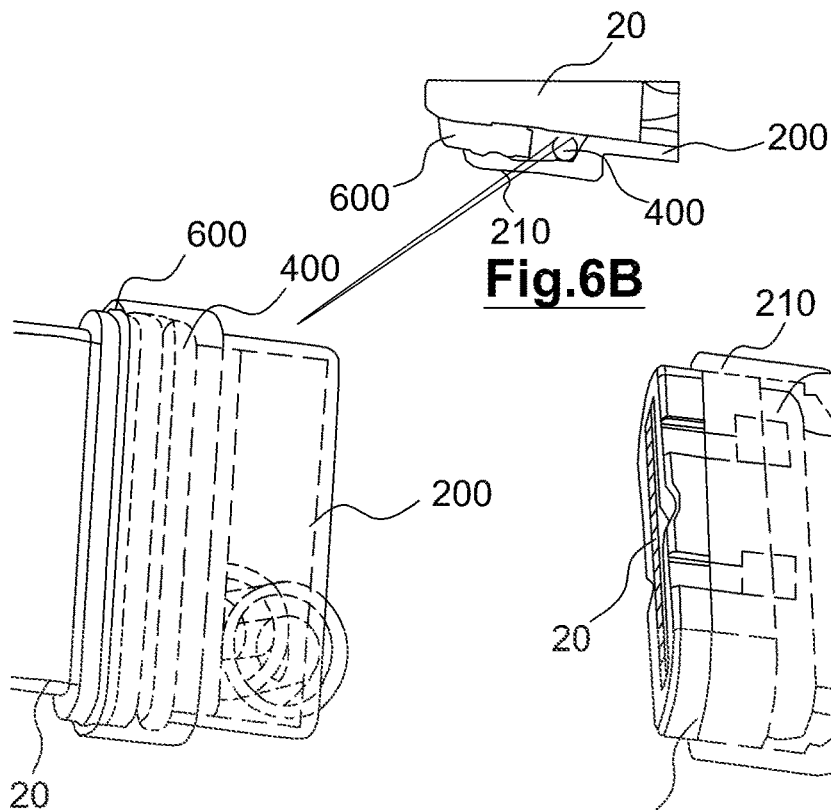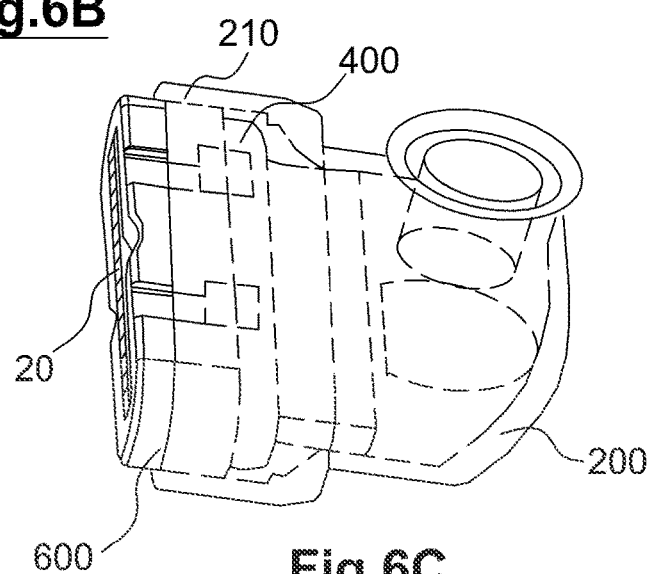

CONNECTOR

CROSS-REFERENCE TO RELATED APPLICATIONS

This application is based on and claims priority under 35 U.S.C. § 119 to French Patent Application No. FR2207144, filed on Jul. 12, 2022, in the French Intellectual Property Office, the disclosure of which is incorporated by reference herein in its entirety.

BACKGROUND

Field

The present disclosure relates to a connector for connecting to a tube, in particular to a microchannel tube. The present disclosure also relates to a set of such a connector and a tube.

Brief Description of Related Developments

In particular, in the field of electric and/or hybrid vehicles, the electrical energy is provided by batteries which are caused to heat up during operation. It is essential to cool the batteries in order to avoid the damage due to excessively high temperatures. Generally, the thermal regulation is ensured by means of a heat transfer fluid which circulates in a thermal management system. Thermal management systems including tubes and connectors, which are used for this purpose, are known from the state of the art. Nevertheless, there are drawbacks in these systems, for example the tubes are secured to the connectors by brazing, or the assembly of the tubes and the connectors seems laborious, or even the structure is complicated to provide a good and reliable sealing within the connector.

The patent document WO2020/187612 describes a connection between a flat tube of mini-channels made of extruded aluminium and a connector. The device provided in this document requires a mounting method which requires complex manoeuvres.

SUMMARY

The present disclosure aims at overcoming these drawbacks, by proposing a modular connector which allows having a simplified mounting with a reduced assembly force and a simple structure while guaranteeing the required sealing.

The present disclosure also relates to the assembly of such a connector and a tube.

To this end, the present disclosure relates to a connector for connecting to a tube. The connector includes a head, a slide provided with a passage orifice, and a seal ring disposed between the head and the slide. The head comprises a housing capable of receiving a first end of the slide.

According to one aspect of the disclosure, the connector has the following features:
the slide received in the housing comprises:
  a first position, called assembly position, in which the slide is capable of receiving a tube via a second end of the slide such that the tube passes through the seal ring; and
  a second position, called working position, in which the seal ring is likely to be compressed or deformed by the first end of the slide;

and that the slide is displaced from the first position to the second position under the effect of a thrust force.

Advantageously, the connector has a simple structure and provides a good and reliable sealing.

In one aspect, the connector comprises a clip disposed between the seal ring and a stop within the housing and the clip comprises an internal space capable of at least partially receiving an end section of a tube.

Advantageously, this allows further retaining a tube which is inserted into the connector. The arrangement of the clip allows preventing the damage to the seal ring by the clip.

In one aspect, the slide is retained on the head in the first position and/or in the second position by mechanical fastening means.

Advantageously, this allows a simple assembly without the need for a tool or a special method.

In one aspect, the slide is retained on the head in the first position and/or in the second position by a snap-fit connection.

Advantageously, this allows obtaining a feeling of clipping during assembly and a simple disassembly.

In one aspect, the seal ring is a gasket ring.

In one aspect, the seal ring is sandwiched between the slide and a wall of the housing when the slide is in the second position.

Advantageously, this allows guaranteeing a sealing.

In one aspect, the seal ring comprises at least two retaining lips on the inner surface thereof.

Advantageously, this allows obtaining a better sealing and/or a better mechanical gripping between the seal ring and the tube.

In one aspect, the slide and the seal ring are overmoulded.

Advantageously, this allows keeping the shape of the seal ring before inserting the tube, and thus avoiding its damage by the tube.

In one aspect, the head includes an opening allowing receiving a tool to disengage the slide in the first position and/or the second position.

In one aspect, the head includes a triangular or trapezoidal shaped cavity in the continuation of the housing.

In one aspect, the head includes visual inspection means allowing checking the state of assembly between the head and the slide.

According to a second aspect of the disclosure, the assembly of a connector and a tube has the following features: the tube received in the slide of the head.

In one aspect, in the second position, the seal ring which is compressed or deformed by the slide ensures a sealing between the head and the tube.

In one aspect, in the second position, the seal ring which is compressed or deformed by the slide ensures a mechanical gripping with the tube.

In one aspect, the tube is a micro-channel tube including at least one flat surface.

In one aspect, the tube is a micro-channel tube including at least one corrugated surface.

Advantageously, the assembly of the connector and of the tube are capable of cooling or heating objects having a variety of surfaces.

In one aspect, in the second position, the seal ring which is compressed or deformed by the slide interferes with an inner wall of the housing.

Advantageously, this allows reinforcing the obtained sealing.

BRIEF DESCRIPTION OF FIGURES

Other advantages, aims and features of the present disclosure will emerge from the following description made, for explanatory and in no way limiting purpose, with regard to the appended drawings, in which:

FIG. 1A represents a perspective view of a connector including a head, a slide and a seal ring according to one aspect of the present disclosure;

FIG. 1B represents a perspective view of a connector comprising a head, a slide, a clip and a seal ring according to another aspect of the present disclosure;

FIG. 2 represents an exploded view of a connector of FIG. 1A and a tube;

FIG. 3A represents a perspective view of the head which is a component of the connector;

FIG. 3B represents a perspective view of a slide to which a seal ring is secured;

FIG. 4 represents a view of a connector which is ready to receive a tube;

FIG. 5 represents a view of an assembled connector including a clip and ready to receive a tube;

FIG. 6A represents a view of a connector of the present disclosure which receives a tube, the slide being in a first position;

FIG. 6B represents a partial sectional view of FIG. 6A;

FIG. 6C represents another view of a connector of the present disclosure which receives a tube, the slide being in a first position;

DETAILED DESCRIPTION

Figure 7A:
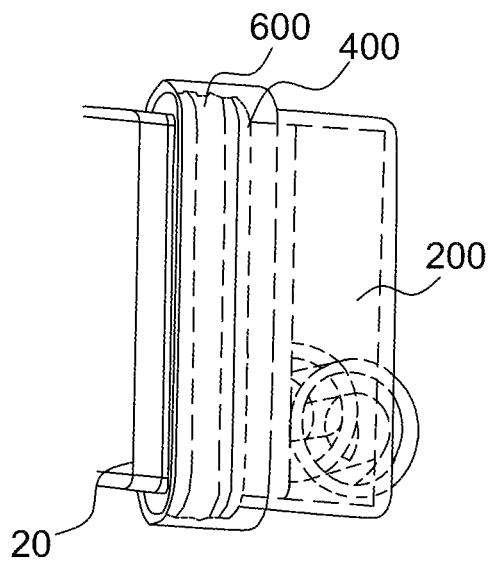
FIG. 7A represents a view of a connector of the present disclosure having received a tube, the slide being in a second position.

The different figures as well as the elements of the same figure are not necessarily represented on the same scale. In all the figures, the identical elements bear the same reference numeral.

The terminology used in this description should in no way be interpreted in a limiting or restrictive manner, simply because it is used in conjunction with a detailed description of certain aspects of the disclosure.

[FIG. 1A] shows a perspective view of a connector 10A according to one aspect of the present disclosure. The connector 10A comprises a head 200, a slide 600 and a seal ring 400. The head 200 includes a housing 230 capable of receiving a first end 602 of the slide. The slide 600 is equipped with a passage orifice and capable of receiving a tube via a second end 604. In the operating state, the seal ring 400 is disposed between the head and the slide.

In a preferred aspect, tube 20 is a mini-channel and/or micro-channel tube (Micro Port Extrusion or MPE or multiport flat tube).

[FIG. 1B] shows a perspective view of a connector 10B according to another aspect. In addition to the head 200, the slide 600 and a seal ring 400, the connector 10B advantageously includes a clip 300. As will be shown below, the clip 300 allows further retaining a tube which is inserted into the connector 10B. Advantageously, the clip 300 is metal.

[FIG. 2] shows an exploded view of the connector 10B having a clip 300 which is ready to connect to a tube 20. In operating mode, the slide 600 is received in the housing 230 of the head 200. The tube 20 passes through the passage orifice 620 and of the seal ring 400. The tube is received by the clip 300 being located at the bottom of the housing 230. One end of the tube 20 is retained by the clip 300 which is itself retained by an inner wall of the housing 230 of the head.

Advantageously, the clip 300 has a "U" section and defines an internal space intended to receive one end of the tube 20. The clip 300 advantageously includes internal retaining means, such as an inner tab 340 or undercut, to retain the tube. The clip 300 also includes external retaining means, such as an outer tab 360 or undercut, allowing it to be retained by the head 200 in the housing 230.

Advantageously, the clip 300 is disposed between the seal ring 400 and the head 200. The tube 20 passes through the seal ring and then is retained by clip 300. This allows preventing the damage to the seal ring by the clip.

In [FIG. 3A], the head 200 of the connector, which includes a body 210 capable of receiving the slide 600 with the housing 230 thereof, is observed.

The head 200 advantageously includes a tip 280 which allows integrating the head 200 into a fluid circulation network, such as a heat transfer fluid. Advantageously, this allows a quick mounting of the connector in a thermal management system. In addition, the connector is removable from the thermal management system and therefore reusable.

In a preferred aspect, the head includes a male tip 280A and a female tip 280B, which allows the heads 200 to be connected to each other directly or via adapters.

Advantageously, no connection part is necessary to directly link connectors and form a circulation passage.

In a preferred aspect, the head 200 is provided with a triangular or trapezoidal shaped cavity 270, as will be shown later.

The [FIG. 3B] represents a preferred aspect in which the slide 600 is secured to the seal ring 400. It is particularly advantageous, because this allows placing the seal ring 400 in the housing 230 while keeping its shape. In a preferred aspect, the slide 600 and the seal ring 400 are overmoulded.

According to an aspect which is not illustrated, the slide 600 and the seal ring 400 are two separate parts. The seal ring can be pre-placed on the slide 600 before it is inserted into the housing 230.

In one aspect, the seal ring 400, independently of the slide 600, can be inserted into the housing 230 of the head 200.

The slide 600 includes a first blocking element 640, such as an undercut, which can cooperate with the first fastening means 220 of the head, such as a window, to form a first mechanical fastening means, such as a snap-fit connection. Advantageously, this allows holding the slide in a first position within the housing 230 of the head. In this first position, the slide 600 is preassembled in the head.

The slide 600 includes a second blocking element 660, such as an undercut, which can cooperate with the second fastening means 240 of the head, such as a window, to form a second mechanical fastening means, such as a snap-fit connection. Advantageously, this allows holding the slide in a second position within the housing 230 of the head.

Advantageously, the head 200 includes an opening allowing receiving a tool to disengage the slide 600 in the first position and/or the second position. In other words, the connector is demonstrable using a simple tool.

In [FIG. 4], there is a connector 10A, in which the slide 600 is received in the head 200 with the seal ring 400 disposed between the head and the slide. The slide 600 is in a first position, called assembly position, in which the slide 600 is ready to receive a tube 20 via an end such that the tube passes through the seal ring 400.

In the aspect illustrated in [FIG. 5], the connector 10B includes a clip 300 located at the bottom of the housing 230 to at least partially retain an end section of the tube 20.

The tube is then inserted into the slide 600 by pushing it towards the head 200 until it abuts the bottom of the housing 230. In the aspect illustrated in FIGS. 6A and 6C, the slide 600 is in the first position with regard to the head 200. The tube 20 passes through the seal ring 400.

In a preferred aspect, the seal ring 400 does not come into contact with the tube 20 in this first position. Advantageously, this allows avoiding the damage to the seal ring 400 by the tube 20 upon its insertion.

In [FIG. 6B], it is shown that the seal ring 400 is located between the lateral wall of the housing 230 and the tube 20, on the one hand, and between the slide 600 and the bottom of the housing 230, on the other hand.

Figure 7C:
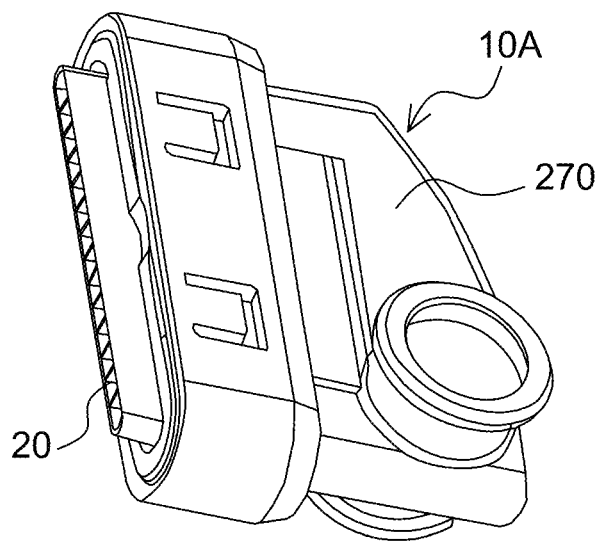
FIG. 7C represents another view of a connector of the present disclosure having received a tube, the slide being in a second position.
Figure 7B:
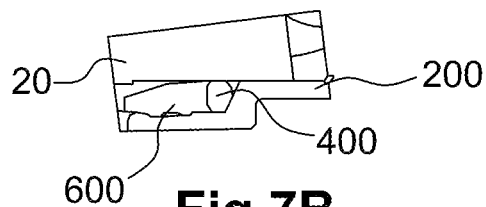
FIG. 7B represents a partial sectional view of FIG. 7A.

The slide 600 is then pressed such that it is displaced from the first position to a second position, called working position, in the housing 230. In this second position, the seal ring 400 is compressed or deformed by the slide 600. FIGS. 7A and 7C illustrate this working position.

As illustrated in [FIG. 6B], the seal ring 400 is sandwiched between the slide 600 and an inner wall of the housing 230 in the second position.

In a preferred aspect, the head 200 is completed by a triangular or trapezoidal shaped cavity 270. The fluid which exits the tube 20 enters the triangular or trapezoidal shaped cavity of the head 200 before exiting through the tip 280. Advantageously, this allows attenuating the hydraulic pressure exerted by the fluid in the connector and the tube.

In one aspect, the head includes visual inspection means allowing checking the state of assembly between the head and the slide, for example a control window.

Advantageously, the seal ring 400 is a compressible gasket ring and has a simple ring shape.

Advantageously, the seal ring has a shape which adapts to the section of the tube 20 and to the wall of the housing 230.

In a preferred aspect, the seal ring 400 is advantageously made of elastomeric material.

In the compressed state, the seal ring 400 comes into contact with the surface of the tube this allowing ensuring the sealing between the tube and the seal ring. Again advantageously, the seal ring 400 which is compressed by the slide 600 ensures a mechanical gripping with the tube which is retained in the connector despite the pressure of the fluid.

Advantageously, the seal ring 400 is of suitable material which allows resisting the fluid pressure difference.

Figure 8A:
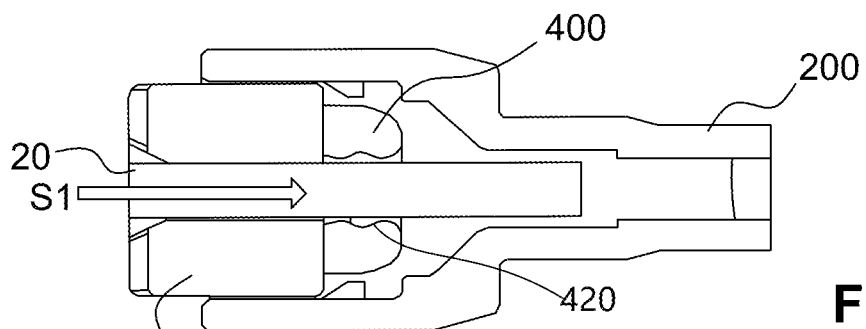
FIG. 8A represents a sectional view of FIG. 6C.

[FIG. 8A] represents a sectional view of [FIG. 6C]. S1 means the direction of fluid circulation in the tube 20. The fluid can also circulate in the reverse direction. The slide 600 housed in the head 200 is in the first position. The head 200 advantageously includes a narrower orifice in the continuity of the housing 230. This orifice is part of the fluid circulation network. It will then be possible to press the tube 20 inserted into the passage orifice of the slide until it abuts a stop.

In one aspect, the tube 20 is embedded in the orifice of the head.

Figure 8B:
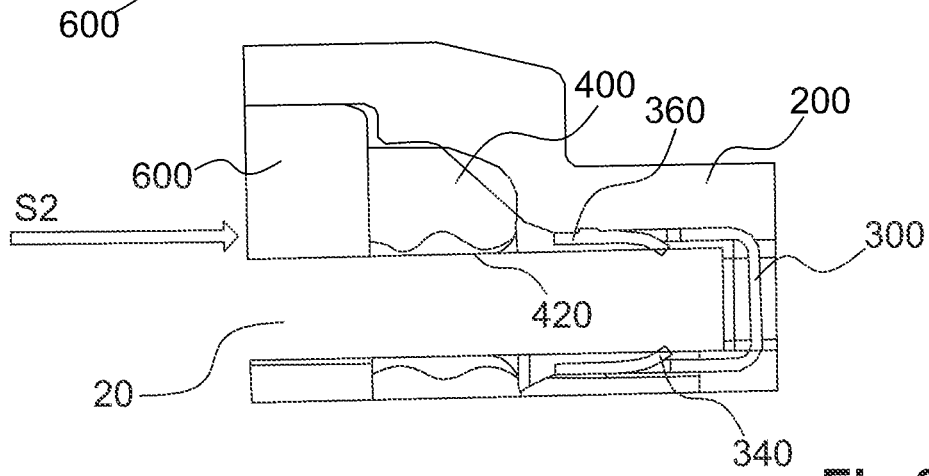
FIG. 8B represents a sectional view of FIG. 7C.

[FIG. 8B] represents a sectional view of [FIG. 7C]. S2 means the direction of thrust force applied to the slide 600 so that it is displaced into the second position.

Advantageously, the fact that the slide 600 enters its second position gives the operator a feeling of clipping.

The seal ring 400 sandwiched between the slide 600 and a wall of the housing 230 is deformed in the second position, so as to create interference with the wall of the housing 230 and with the outer surface of the tube 20. The presence of reference advantageously ensures the sealing of the different interfaces. Advantageously, the tube 20 has a rigid outer surface. This allows reinforcing the obtained sealing.

Advantageously, this allows reducing the assembly force, more particularly the force to introduce the tube, because the seal ring is compressed by the slide after the insertion of the tube 20 into the connector. This elastic deformation ensures the contact sealing at the joint plane.

Advantageously, the deformation of the seal ring allows increasing the contact pressure between the seal ring and the tube.

In an aspect which is not illustrated, the seal ring 400 is provided with two retaining lips 420 on the inner surface thereof. This allows obtaining a better sealing and/or a better mechanical gripping relative to the tube 20. The seal ring can include even more retaining lips on the inner surface thereof.

Figure 9A:
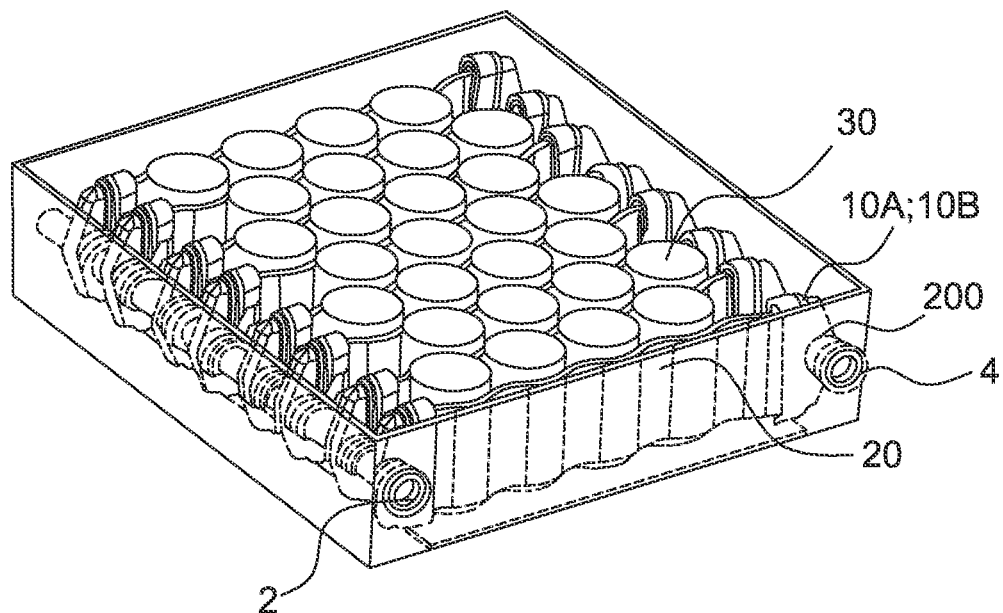
FIG. 9A represents a perspective view of a group of cylindrical cells whose thermal management tubes are connected by connectors according to the present disclosure.

[FIG. 9A] represents a perspective view of a group of cylindrical batteries 30 integrated into a thermal management system whose thermal management tubes 20 are connected to the connectors 10A, 10B according to the present disclosure. Advantageously, the tube 20 has at least one corrugated surface which is in contact with objects to be cooled such as prismatic batteries 30. The thermal management system further includes a common input 2 and an output 4.

In an aspect which is not illustrated, the tube 20 advantageously has at least one flat surface which is in contact with objects to be cooled such as cylindrical, prismatic "pouch" type batteries.

Figure 9B:
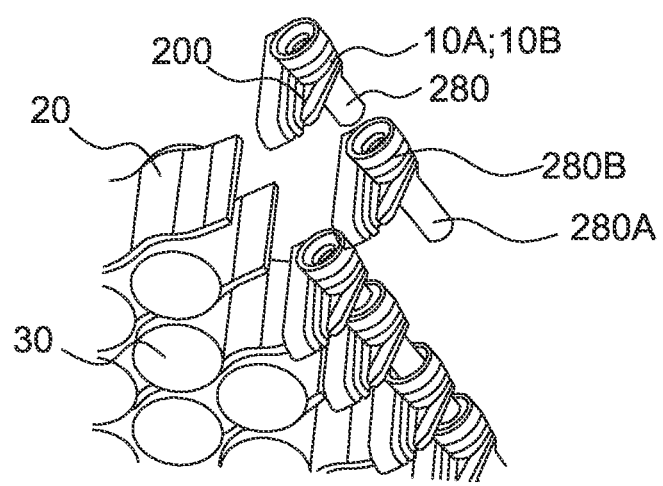
FIG. 9B represents a partial view of the group of FIG. 9A with two connectors to be mounted.

[FIG. 9B] shows a partial view of the battery group of [FIG. 9A].

Advantageously, the male tip 280A and the female tip 280B allow the connectors to be linked and integrated into the thermal management system.

Figure 10A:
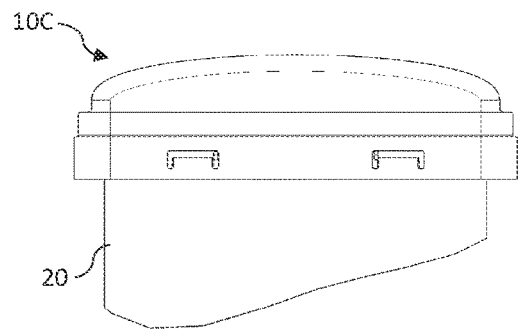
FIG. 10A represents a top view of a connector according to one aspect having received a tube.
Figure 10B:
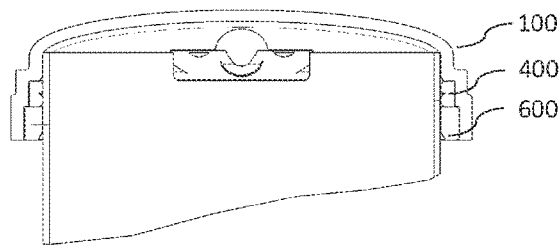
FIG. 10B represents a sectional view of the device of FIG. 10A.
Figure 10C:
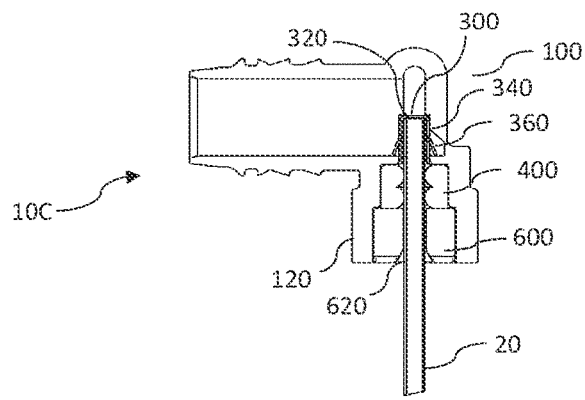
FIG. 10C represents another sectional view of the device of FIG. 10A.

FIGS. 10A-10C illustrate a variant of a connector according to the present disclosure. This connector can have all features of a connector which is previously presented in this disclosure.

In [FIG. 10A], a top view of a connector 10C is shown according to this aspect having received a tube 20.

The head 100 includes a tip on the same plane of the head 100. Advantageously, the head 100 is provided, on the same plane as the head, with two opposite ends, this allowing the connectors to be connected directly or via an adapter.

A sectional view of a connector is shown in [FIG. 10B] according to this aspect. The slide 600 is in the second position with the compressed seal ring 400 which is sandwiched between the slide and a wall of the housing.

[FIG. 10C] represents another sectional view of a connector 10C of [FIG. 10A] which further includes a clip 300. The tube 20 is retained by the clip 300 in this position.

Figure 11:
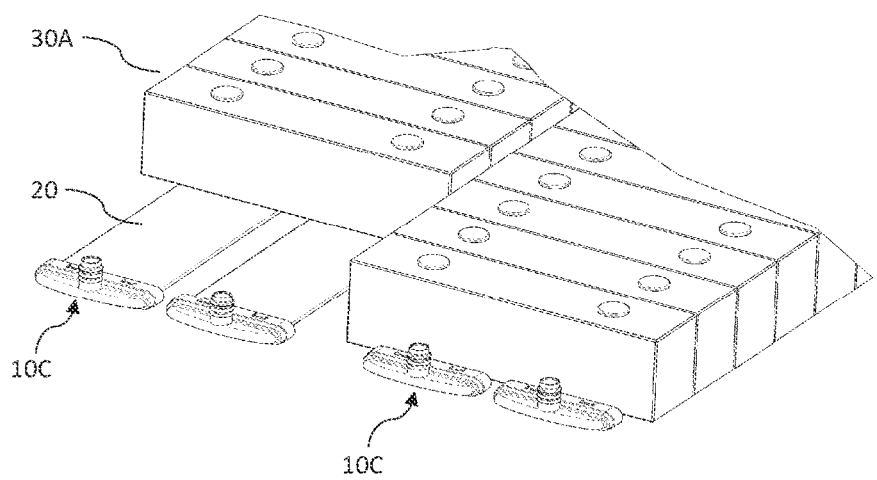
FIG. 11 represents a top view of linked connectors, all having received a tube.

[FIG. 11] represents a perspective view of a group of prismatic batteries 30A which are integrated into a thermal management system.

[FIG. 11] shows a portion of a thermal management system in which connectors 10C are interconnected and are connected to the tubes 20.

In one aspect which is not illustrated, the connectors 10C are interconnected via an adapter.

LIST OF REFERENCE SIGNS

TABLES 1

| References | Designations |
| --- | --- |
| 10A; 10B; 10C | Connector |
| 20 | Tube |
| 22 | Channel |
| 30 | Battery (cylindrical cell) |
| 30A | Battery (prismatic cell) |
| 100 | Head |
| 200 | Head |
| 210 | Body |
| 220 | First fastening means |
| 230 | Housing |
| 240 | Second fastening means |
| 260 | Visual inspection means |
| 270 | Triangular or trapezoidal portion |
| 280 | Tip |
| 280A | Male |
| 280B | Female tip |
| 300 | Clip |
| 320 | Internal Space |
| 340 | Inner tab |
| 360 | Outer tab |
| 400 | Seal ring |
| 420 | Retaining lip |
| 600 | slide |
| 602 | First end |
| 604 | Second end |
| 640 | First blocking element |
| 660 | Second blocking element |

What is claimed is:

1. A connector for connecting to a tube, comprising: a head, a slide provided with a passage orifice, and a seal ring disposed between the head and the slide, the head including a housing capable of receiving a first end of the slide,
   characterised in that the slide received in the housing comprises:
   a first position, called assembly position, in which the slide is capable of receiving a tube via a second end of the slide such that the tube passes through the seal ring; and
   a second position, called working position, in which the seal ring is likely to be compressed by the first end of the slide; and
   that the slide is displaced from the first position to the second position under the effect of a thrust force.

2. The connector according to claim 1, characterised in that it comprises a clip disposed between the seal ring and a stop within the housing and the clip comprises an internal space capable of at least partially receiving an end section of a tube.

3. The connector according to claim 1, characterised in that the slide is retained on the head in the first position and/or in the second position by mechanical fastening means.

4. The connector according to claim 1, characterised in that the slide is retained on the head in the first position and/or in the second position by a snap-fit connection.

5. The connector according to claim 1, wherein the seal ring is a gasket ring.

6. The connector according to claim 1, wherein the seal ring is sandwiched between the slide and a wall of the housing when the slide is in the second position.

7. The connector according to claim 1, wherein the seal ring comprises at least two retaining lips on the inner surface thereof.

8. The connector according to claim 1, wherein the slide and the seal ring are overmoulded.

9. The connector according to claim 1, wherein the head includes an opening allowing receiving a tool to disengage the slide in the first position and/or the second position.

10. The connector according to claim 1, wherein the head includes a triangular or trapezoidal shaped cavity in the continuation of the housing.

11. The connector according to claim 1, wherein the head includes visual inspection means allowing checking the state of assembly between the head and the slide.

12. An assembly of a connector according to claim 1 and a tube received in the slide.

13. The assembly according to claim 12, characterised in that, in the second position, the seal ring which is compressed by the slide ensures a sealing between the head and the tube.

14. The assembly according to claim 12, characterised in that, in the second position, the seal ring which is compressed by the slide ensures a mechanical gripping with the tube.

15. The assembly according to claim 12, characterised in that the tube is a micro-channel tube including at least one flat surface.

16. The assembly according to claim 12, characterised in that the tube is a micro-channel tube including at least one corrugated surface.

17. The assembly according to claim 12, characterised in that, in the second position, the seal ring which is compressed by the slide interferes with an inner wall of the housing.

* * * * *